(12) United States Patent
Wang et al.

(10) Patent No.: US 8,401,125 B2
(45) Date of Patent: Mar. 19, 2013

(54) RECEIVING APPARATUS AND METHOD WITH NO OVERSAMPLING ANALOG TO DIGITAL CONVERSION

(75) Inventors: Zhaocheng Wang, Beijing (CN); Richard Stirling-Gallacher, Stuttgart (DE); Ralf Boehnke, Esslingen (DE)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 12/631,070

(22) Filed: Dec. 4, 2009

(65) Prior Publication Data

US 2010/0226462 A1 Sep. 9, 2010

(30) Foreign Application Priority Data

Mar. 4, 2009 (EP) ..................................... 09154311

(51) Int. Cl.
 *H04L 27/06* (2006.01)
 *H04L 7/00* (2006.01)
(52) U.S. Cl. ...................................... 375/340; 375/355
(58) Field of Classification Search .................. 375/260, 375/316, 340, 355
 See application file for complete search history.

(56) References Cited

U.S. PATENT DOCUMENTS

| 5,761,211 A | 6/1998 | Yamaguchi et al. |
| 6,310,570 B1 | 10/2001 | Rumreich et al. |
| 7,012,882 B2 | 3/2006 | Wang et al. |
| 2002/0001352 A1 | 1/2002 | Stirling-Gallacher et al. |
| 2002/0172187 A1 | 11/2002 | Shalvi et al. |
| 2006/0209979 A1* | 9/2006 | Sandell et al. ................ 375/267 |
| 2006/0269018 A1* | 11/2006 | Li et al. ......................... 375/343 |
| 2006/0277853 A1 | 12/2006 | Dillon |

FOREIGN PATENT DOCUMENTS

| CN | 1512795 A | 7/2004 |
| DE | 199 17 334 A1 | 10/2000 |
| EP | 1 755 254 A1 | 2/2007 |
| WO | WO 2004/059864 A1 | 7/2004 |

OTHER PUBLICATIONS

U.S. Appl. No. 12/619,847, filed Nov. 17, 2009, Stirling-Gallacher, et al.
U.S. Appl. No. 12/620,797, filed Nov. 18, 2009, Wang, et al.
Jui-Yuan Yu, et al., "A Symbol-Rate Timing Synchronization Method for Low Power Wireless OFDM Systems," IEEE Transactions on Circuits and Systems—II: Express Briefs, vol. 55, No. 9, Sep. 2008, pp. 922-926.

(Continued)

*Primary Examiner* — Don N Vo
(74) *Attorney, Agent, or Firm* — Oblon, Spivak, McClelland, Maier & Neustadt, L.L.P.

(57) ABSTRACT

A receiving apparatus and a receiving method for receiving signals in a wireless communication system are presented, the signals including a dedicated channel estimation sequence. The apparatus includes an analog to digital converter that converts received signals into digital samples with a sampling rate identical to a symbol rate of the received signals, a channel estimation unit that performs a channel estimation based on the dedicated channel estimation sequence comprised in a digital samples of the received signals, an evaluation unit that evaluates the channel estimation result from the channel estimation unit, and a control unit that controls a phase of the sampling rate of the analog to digital converter based on an evaluation of the channel estimation result. The present invention further relates to a corresponding receiving method.

12 Claims, 3 Drawing Sheets

OTHER PUBLICATIONS

"Merged proposal: New PHY Layer and Enhancement of MAC for mmWave System Proposal," doc.:IEEE 802.15-07-0934-01-003c, Nov. 2007, TG3c Proposal, pp. 89.

Andre Bourdoux, et al., "PHY Layer Submission for 802.15.3c," doc.:IEEE 802.15-0691-00-003c, May 7, 2007, pp. 34.

Andre Bourdoux, et al., "PHY Layer Submission for 802.15.3c," doc.:IEEE 802.15-0691-01-003c, May 7, 2007, pp. 61.

Chinese Office Action Issued Jun. 4, 2012 in Patent Application No. 201010129726.7 (with English translation).

* cited by examiner

○ ○  Transition period due to the changement of Ctrl

RECEIVING APPARATUS AND METHOD WITH NO OVERSAMPLING ANALOG TO DIGITAL CONVERSION

BACKGROUND

1. Field of the Invention

The present invention relates to a receiving apparatus and a receiving method for receiving signals in a wireless communication system.

2. Description of Related Art

Most receiver implementations of wireless communication systems use an analog to digital converter to convert received signals after their down conversion to the baseband into digital samples (mostly complex digital samples). In some wireless communication systems, such as for example single carrier frequency domain equalization (SC-FDE) systems, or other wireless communication systems, the sampling rate (also called sampling frequency) of the analog to digital converter is two times or more (sometimes four times or eight times or more) the symbol rate of the transmitted and received signals. Particularly, in wireless communication systems, in which the symbol rate is rather high, for example around or more than 1 Gbps, the complexity, the manufacturing costs and the power consumption of the analog to digital converters becomes quite high.

BRIEF SUMMARY

The object of the present invention is therefore to suggest a receiving apparatus and method for receiving signals and wireless communication system with an analog to digital conversion with a reduced complexity and power consumption.

The above object is achieved by a receiving apparatus according to claim 1 and a receiving method according to claim 8.

The present invention suggests a receiving apparatus or receiving signals in a wireless communication system, in which the signals comprise a dedicated channel estimation sequence, comprising an analog to digital converter adapted to convert received signals into digital samples with a sampling rate identical to a symbol rate of the received signals, a channel estimation means adapted to perform a channel estimation on the basis of the dedicated channel estimation sequence comprised in the digital samples of the received signals, an evaluation means adapted to evaluate the channel estimation result from the channel estimation means, and a control means adapted to control a phase of the sampling rate of the analog to digital converter on the basis of an evaluation of the channel estimation result.

The present invention further suggests a receiving method for receiving signals in a wireless communication system, in which the signals comprise a dedicated channel estimation sequence, comprising the steps of analog to digital converting received signals into digital samples with a sampling rate identical to a symbol rate of the received signals, performing a channel estimation on the basis of the dedicated channel estimation sequence comprised in the digital samples of the received signals, evaluating the channel estimation result from the channel estimation means, and controlling a phase of the sampling rate of the analog to digital converter on the basis of an evaluation of a channel estimation result.

Therefore, by holding and adjusting the phase of the sampling rate of the analog to digital converter on the basis of an evaluation of the channel estimation result, it becomes possible to implement an analog to digital converter which is adapted to convert the received signals into digital samples with a sampling rate which is identical to the symbol rate of the received signals. In other words, the analog to digital converter suggested by the present invention is not oversampling the received signals, but samples the received signals with the symbol rate of the received signals. Thus, the analog to digital conversion can be implemented with reduced cost, reduced complexity and reduced power consumption as compared to prior art oversampling analog to digital conversions.

Advantageously, the dedicated channel estimation sequence in the transmitted and received signals comprises a first and a second dedicated channel estimation sequence, and the channel estimation means is adapted to perform the channel estimation on the first and the second dedicated channel estimation sequence. Hereby, the control means is advantageously adapted to control the phase of the sampling rate of the analog to digital converter so that the analog to digital converter converts the first dedicated channel estimation sequence with a sampling rate having a first phase and second dedicated channel estimation sequence with the sampling rate having a second phase, the first phase being different from said second phase. Further advantageously, the evaluation means is adapted to evaluate the quality of the channel estimation result for the first and the second dedicated channel estimation sequence and to provide a control signals to the control means on the basis of the evaluation.

Therefore, the present invention suggests a new (time domain) frame structure for the signals transmitted and received in the wireless communication system, namely a dedicated channel estimation sequence in a frame comprising (at least) a first and a second dedicated channel estimation sequence. In the receiving apparatus of the present invention, the first and the second (or further) channel estimation sequences can be analog to digital converted with the same sampling rate (which is identical to the symbol rate of the received signals) but with different phases. Then, the channel estimation results for the first and the second (or further) dedicated channel estimation sequences can be compared and evaluated. The channel estimation result having the best quality is identified and the phase of the sampling rate of the analog to digital converter is set to the same phase which was used to analog to digital convert the dedicated channel estimation sequence with this best quality. The analog to digital converter then is set to sample the received signals, in particularly the data content in the received signals, with this phase.

The present invention therefore suggests a very simple but effective way to implement an analog to digital conversion with a sampling rate which is identical to the symbol rate of the received signals.

The evaluation means which is adapted to evaluate the quality of the channel estimation result for the first and the second (or further) dedicated channel estimation sequences and to provide a control signal to the control means on the basis of the evaluation can be implemented or set to any wanted or desired quality parameter for the channel estimation result. An example is to implement the evaluation means to detect if the first or the second (or further) dedicated channel estimation sequence has a higher correlation peak and to identify the dedicated channel estimation sequence with a higher correlation peak as the one with the best quality. Alternatively, the evaluation means could be adapted to detect the dedicated channel estimation sequence with the highest power. However, any other desired quality parameter could be used and implemented.

The first and the second (or further) dedicated channel estimation sequences on which a channel estimation is performed in the channel estimation means could be identical or could also be different from each other.

It is to be understood that the receiving apparatus and the receiving method of the present invention can be implemented in any kind of suitable device, unit, apparatus and so forth, if necessary in combination with other features and functionalities necessary for the respective application. For example, the receiving apparatus could be realized as a portable, hand-held, stand alone, permanent etc. device adapted to communicate in any kind of wireless communication system. The wireless communication system can be any kind of wireless communication system in which any kind of data are transmitted and received over a wireless interface. For example, the wireless communication system could be any kind of multicarrier system, or any kind of single carrier system. For example, the receiving apparatus and method could comprise a frequency domain equalization, i. e. an equalization which takes place in the frequency domain, and could be implemented in a single carrier communication system. However, the receiving apparatus and the receiving method of the present invention are not limited to these examples. Further, the receiving apparatus could be part of a communication apparatus adapted to receive and transmit signals in the wireless communication system. The term "means" is used throughout the present application is intended to characterize any kind of implementation in the functional unit adapted to perform the respective functions, such as not limited to any kind of unit, element, device, eventually in combination with other functionalities, and could be implemented in any kind of suitable software, hardware or any suitable mixture thereof. Further, the present invention is related to any kind of wireless communication system in which the signals are transmitted and received in frames, wherein each frame comprises one or more dedicated channel estimation sequences, i. e. sequences which are used on the receiving side to perform a channel estimation. Each frame also comprises content data arranged in any suitable way, for example in data blocks or the like. Each frame could or could not comprise additional parts, such as synchronization sequences and the like.

BRIEF DESCRIPTION OF THE DRAWINGS

The present invention is explained in more detail in the following description of a preferred embodiment in relation to the enclosed drawings, in which.

DETAILED DESCRIPTION

The following description of a preferred embodiment of the present invention relates to a receiving apparatus and method in which a single carrier frequency domain equalisation is implemented. However, the present invention is not restricted to single carrier systems, but could also be used in multicarrier systems. Further, implementations of the present invention could be possible in systems with a time domain equalization.

Figure 1:
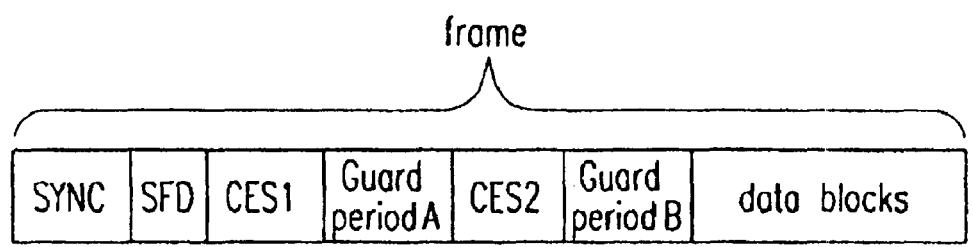
FIG. 1 shows a schematic example of frame structure used in the present invention.

FIG. 1 shows a schematic example of a frame structure for the signals transmitted and received in a wireless communication system as used in the receiving apparatus and the method of the present invention. The shown example of the frame structure comprises a synchronization part (SYNC), which is followed by a start frame delimiter (SFD), which is followed by a channel estimation sequence (CES), which is then followed by one or more data blocks. The synchronization part is used in the receiving apparatus 1 as shown and explained in relation to FIG. 2 for automatic game control and coarse frame timing. The start frame delimiter indicates the end of the synchronization sequence and the beginning of the channel estimation sequence. The channel estimation sequence may be or comprise any kind of suitable dedicated channel estimation sequence used for channel estimation in the receiving apparatus. In the example of the frame structure shown in FIG. 1, the channel estimation sequence comprises a first dedicated channel estimation sequence (CES 1), and the second dedicated channel estimation sequence (CES 2), which are each followed by a guard period (guard period A and guard period B, respectively). The first and the second dedicated channel estimation sequence (CES 1 and CES 2, respectively), could be identical or could be different from each other in respect of the content and/or in respect of the respective length. The guard period A and the guard period B advantageously have the same length but could also have different lengths. The length of the guard period A and the guard period B, however, should be set so that a switching of the phase of the symbol rate of the analog to digital converter of the receiving apparatus is possible, as will be explained further below. The data blocks are typically arranged in a way that a block with data content is followed by a guard interval. However, other arrangements might be possible.

Figure 2:
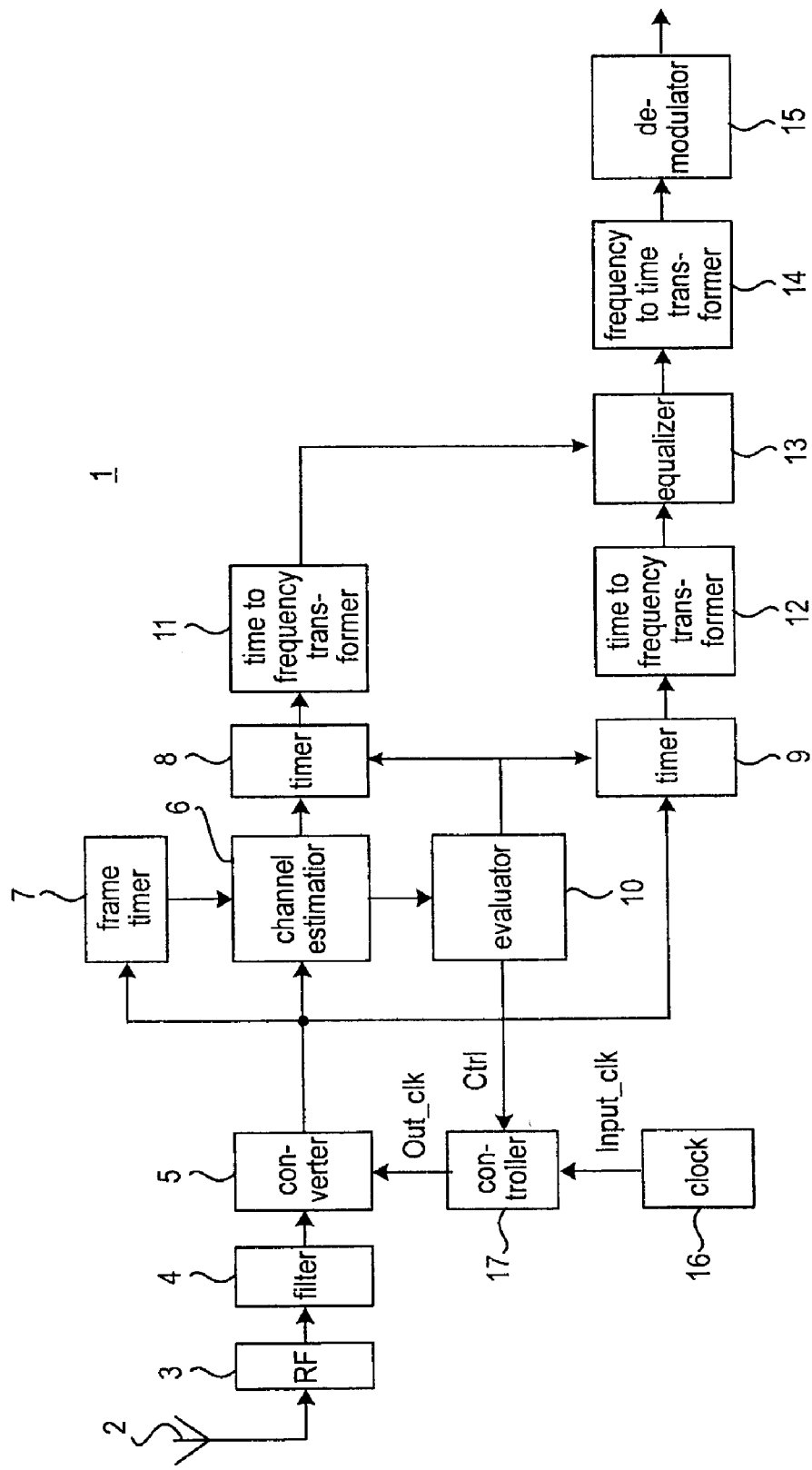
FIG. 2 shows a schematic block diagram of a receiving apparatus of the present invention.

FIG. 2 shows a schematic block diagram of an embodiment of the receiving apparatus 1 for receiving signals in a wireless communication system according to the present invention. It has to be noted that FIG. 2 and the following explanation only refers to elements and functionalities of the receiving apparatus 1 which are necessary for the understanding of the present invention. In a practical implementation, the receiving apparatus will contain additional functionalities and elements for a normal operation.

The receiving apparatus 1 comprises an antenna 2 adapted to receive wireless signals in the wireless communication system. The received signals are forwarded to a RF (radio frequency) unit 3 or the like adapted to down-convert the received signals from the radio frequency to the baseband. The received down-converted signals are then forwarded to a analog pulse filter 4 which normally has the same pulse shape as the transmitted pulse. The pulse shaped signals are then forwarded to an analog to digital converter 5 which is adapted to convert the received signals and to digital samples, for example complex samples, with a sampling rate identical to the symbol rate of the received signals.

In this context, it should be mentioned that the synchronization part, the start frame delimiter, the channel estimation sequences and the data blocks of the frame as shown in FIG. 1 each consist of a certain number of symbols, each symbol corresponding to a sample (for example a complex sample). The symbol rate of the transmitted and received signals is the number of symbols per second. In other words, the analog to digital converter 5 does not perform an oversampling, but samples the received signals with a sampling rate which is identical to the symbol rate (or bit rate) of the receiving signal. The sampling rate of the analog to digital converter 5 is hereby provided by a clock means 16 which provides a clock signal with a rate of frequency being identical to the symbol rate of the received signals. The clock signals generated in output by the clock means 16 are hereby supplied to a control means 17 which is adapted to control and change the phase of the clock signals before they are supplied to the analog to digital converter 5, which will be explained in more detail further below.

The digital sample output from the analog to digital converter 5 is split onto several branches, whereby FIG. 2 only shows three different branches for the sake of clarity. The first branch leads to a frame timing means 7, to which the digital samples of the synchronizing part (SYNC) of each frame are supplied. The frame timing means 7 is adapted to perform a synchronization, for example by performing an auto-correlation or a cross-correlation or any other suitable processing on the synchronizing part in order to obtain a synchronizing peak which indicates the start position of the channel estimation sequence in each frame. Information about the start position of the channel estimation sequence is supplied from the frame timing means 7 to a channel estimation means 6, which is part of a second branch.

Via the second branch, the channel estimation means 6 receives a digital sample of the channel estimation sequence from the analog to digital converter 5. Hereby, the channel estimation means 6 performs auto-correlation, cross-correlation, or any other suitable processing in order to obtain a time domain based channel estimation, which is for example a complex estimation of the channel (I and Q). Since the frames of the wireless communication system of the present invention as shown in FIG. 1 comprise (at least) a first and a second channel estimation sequence, the channel estimation means 6 calculates and obtains two channel delay profiles, namely a first channel delay profile on the basis of the first channel estimation sequence (CS1) and a second channel delay profile on the basis of the second channel estimation sequence (CS2). The channel estimation means 6 thus performs a full (complete) channel estimation.

Hereby, the first and the second channel delay profile are obtained in the channel estimation means 6 one after the other in time. Hereby, it is to be noted that the analog to digital converter 5 sample the first and the second channel estimation sequence with the same sampling rate (which is identical to the symbol rate of the received signals), but with different phases. That is, the control means 17 changes the phase of the sample rate clock signal from the clock means 16 after the first channel estimation sequence has been sampled by the analog to digital converter 5. The control means 17 hereby receives a control signal from an evaluation means 10 which evaluates the channel delay profiles calculated in the channel estimation means 6. When the channel estimation means 6 has established the first channel delay profile on the basis of the first dedicated channel estimation sequence, the evaluation means 10 detects that a first channel delay profile has been established and supplies a control signal to the control means 17 which causes to control means 17 to change the phase of the sample rate clock signal from the clock means 16.

Figure 3:
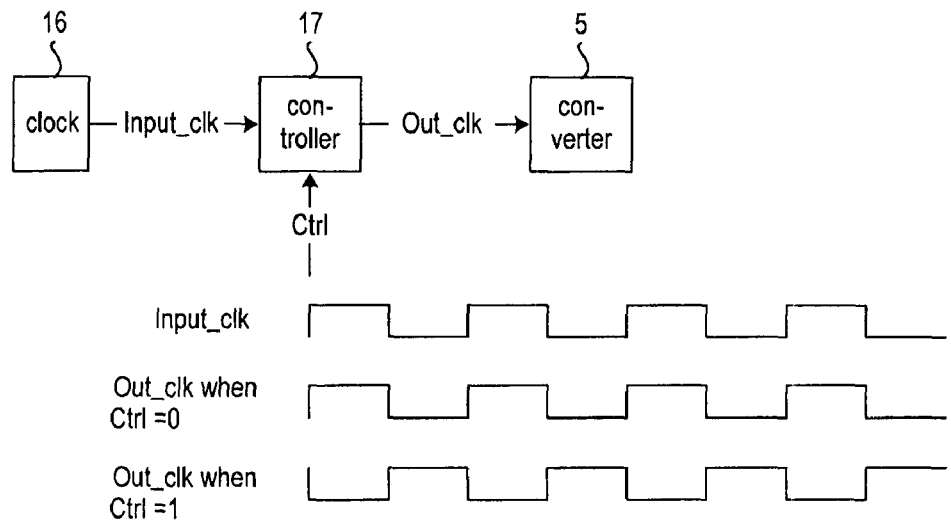
FIG. 3 shows a schematic block diagram of a control means of the receiving apparatus of the present invention.

The situation is visualized in FIG. 3 which shows a schematic block diagram of the clock means 16, the control means 17 and the analog to digital converter 5 as well as an example of a sample rate clock signal output from the clock means 16. When the control signal (Ctrl) output from evaluation means 10 to the control means 17 is low (Ctrl=0), the sample rate clock signal from the clock means 16 remains unchanged, i. e. its phase is not changed. However, when the control signal from the evaluation means 10 has a high level (Ctrl=1), for example when the evaluation means 10 has detected that the channel estimation means 6 has finished the calculation of the first channel delay profile, the control means 17 changes the phase of the sample rate clock signal.

In the shown example, the control means 17 in this case inverts the phase of the sample rate clock signal, so that the analog to digital converter 5 will then sample the second dedicated channel estimation sequence with the same rate but with an inverted phase as compared to the sampling of the first channel estimation sequence. Hereby, the guard period A between the first and the second channel estimation sequences has a sufficient length enabling the evaluation means 10 to detect if the channel estimation means 6 has finalized the first channel delay profile and—if yes—to output corresponding control signal to the control means 17, which then changes the phase of the sample rate clock signal. The channel estimation means 6 therefore generates two different channel delay profiles, i. e. a first channel delay profile on the basis of the first channel estimation sequence and a second channel delay profile on the basis of the second channel estimation sequence which were sampled in the analog to digital converter 5 with the same sampling rate but with a different phase. It should be understood that it could be possible to use three or more channel estimation sequences which could each be sampled with the same rate but with different phases in the analog to digital converter 5.

The evaluation means 10 is further adapted to compare the channel delay profiles established by the channel estimation means 6 and to determine, on the basis of one or more pre-set quality parameters, which one of the channel delay profiles has a better quality or ensures a better equalization of the data in a succeeding equalization. Hereby, any useful or wanted quality parameter(s) can be used to select the better channel delay profile. For example, the channel delay profile which has the highest or strongest correlation peak (last peak in the profile) could be selected. Otherwise, the channel delay profile having the larger overall power could be selected. Alternatively, the channel delay profile which ensures a better performance in the succeeding equalization of the content data could be chosen depending on any wanted or useful parameter.

When the evaluation means 10 has decided which one of the channel delay profiles has the better quality, it sends a control signal to the control means 17 to control the phase of the sample rate clock signal so that the analog to digital converter 5 will sample the succeeding content data in the data blocks with a sample rate phase which corresponds to the sample rate phase which has been used to sample the channel estimation sequence which resulted in the channel delay profile which was chosen as having the better quality by the evaluation means 10. In other words, the data symbols comprised in the data blocks of a received frame will be sampled by the analog to digital converter 5 with a sample rate phase which was selected by the evaluation means 10 to give the better channel delay profile.

Figure 4:
FIG. 4 shows a schematic block diagram of a frame structure of the present invention and the way the phase of the sampling rate has been switched.
Figure 4:
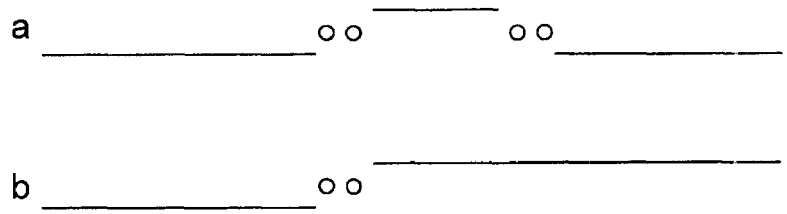

This situation is visualized in FIG. 4 which shows schematically a frame as well as the control signal output from the evaluation means 10 to the control means 17. As explained above, a typical frame could comprise SYNC part, a SFD part, a first channel estimation sequence of (CES1), a second channel estimation sequence (CES2), and data blocks. Between the first and the second channel estimation sequence as well as after the second channel estimation sequence, guard periods are provided. During the sampling of the SYNC part, the SFD part and the first channel estimation sequence, the phase of the sampling rate of the analog to digital converter 5 will not be changed, i. e. the control signal provided from the evaluation means 10 to the control means 17 remains unchanged. After the first channel delay profile was established by the channel estimation means 6 on the basis of the first channel estimation sequence, the control signal is switched during the first guard period (guard period A), so that a second channel estimation sequence is sampled by the analog to digital converter 5 with a different phase. Thereafter, depending on which of the channel delay profiles is identified in the evaluation means 10 as having the better quality, the control signal is either switched back during the second guard period (guard period B), so that the data content will be sampled in the analog to digital converter 5 with the phase which was used to sample the first channel estimation sequence, as shown in the schematic graph a in FIG. 4. Alternatively, in case that the second channel delay profile is identified in the channel estimation means 10 as having the better quality, the control signal is not changed so that the analog to digital converter 5 will sample the content data with a phase which was used to sample the second channel estimation sequence, as shown in the schematic graph b of FIG. 4.

As shown in FIG. 2, the third branch of the receiving apparatus 1 is the branch in which the content data of the data blocks in the received signals are processed other branches in an actual implementation which were not shown in FIG. 2 could include blocks to perform frequency offset compensation, clock offset compensation and so forth. The content data are sampled in the analog to digital converter 5 with the sampling rate being identical to the symbol rate and having a phase as set by the control means under the control of the evaluation means 10. The digital samples of the content data are supplied to a timing means 9 and then to a time to frequency transformation means 12 (e.g. a Fast Fourier Transformation means or any other suitable means) which is adapted to perform a time to frequency transformation of the content data. Thereafter, the content data are equalized in the frequency domain by an equalizing means 13 and then transformed back into the time domain by a frequency to time transformation means 14 (e.g. a Inverse Fast Fourier Transformation means or any other suitable means). Thereafter, the equalized data are further processed in the time domain with the additional necessary processing functionalities, such as a demodulator 15 and so forth.

The equalizing means 13 hereby adapted to perform an equalization of the data on the basis of equalizing coefficients calculated on the basis of the channel delay profile which has been identified by the evaluation means 10 as the channel delay profile with the better quality as explained above. The evaluation means 10 hereby detects the start position of this channel delay profile and supplies this information to the timing means 8 arranged after the channel estimation means 6 as well as the previously mentioned timing means 9 in the data branch. The start position of the selected channel delay profile is controlled by the timing means 8 and the start position of the data going into the time to frequency transformation means 12 (e.g. a Fast Fourier Transformation means or any other suitable means) is controlled by the timing means 9, respectively, under the control of evaluation means 10. The channel delay profile is supplied to a time to frequency transformation means 11 (e.g. a Fast Fourier Transformation means or any other suitable means), transformed into the frequency domain and forwarded to the equalizing means 13. In other words, the evaluation means 10, by controlling the timing means 8 and the timing means 9, aligns and synchronizes the start position of the selected channel delay profile and the content data to be channel equalized on the basis of the selected channel delay profile.

It is to be noted that the various functionalities of the evaluation means 10 as described above could be implemented in one unit or in several separate units depending on the implementation references.

As described above, the present invention suggests a simple but very effective way to implement an analog to digital conversion without oversampling. Specifically, the manufacturing costs of such an analog to digital converter could be reduced, as well as its power consumption and its complexity. Another advantage of the present invention that higher symbol rates can be supported as compared to systems in which an oversampling in an analog to digital converter is implemented.

The invention claimed is:

1. A receiving apparatus that receives signals in a wireless communication system, in which the signals include a dedicated channel estimation sequence having a first and a second dedicated channel estimation sequence, the apparatus comprising:
    an analog to digital converter that converts received signals to digital samples with a sampling rate identical to a symbol rate of the received signals;
    a channel estimation unit that performs a channel estimation based on the first and second dedicated channel estimation sequences included in the digital samples of the received signals;
    an evaluation unit that evaluates a channel estimation result from the channel estimation unit; and
    a control unit that controls a phase of the sampling rate of the analog to digital converter so that the analog to digital converter converts the first dedicated channel estimation sequence with a sampling clock having a first phase and the second dedicated channel estimation sequence with the sampling clock having a second phase, the first phase being different from said second phase,
    wherein the evaluation unit detects which of the first or the second dedicated channel estimation sequence has the best quality, and
    the control unit sets the phase of the sampling clock of the analog to digital converter based on the evaluation of the channel estimation result to the same phase which was used to analog to digital convert the dedicated channel estimation sequence with the best quality.

2. The receiving apparatus according to claim 1, wherein the evaluation unit evaluates a quality of the channel estimation result for the first and the second dedicated channel estimation sequence and provides a control signal to the control means on the basis of the evaluation.

3. The receiving apparatus according to claim 2, wherein the evaluation unit detects when the first or the second dedicated channel estimation sequence has a higher correlation peak and provides the control unit with a control signal to control the analog to digital converter to convert data content included in the received signals with the sampling rate phase of the first or the second dedicated channel estimation sequence.

4. The receiving apparatus according to claim 1, wherein the channel estimation unit performs said channel estimation on the first and the second dedicated channel estimation sequence, said first and the second dedicated channel estimation sequence being identical.

5. The receiving apparatus according to claim 1, wherein the channel estimation unit performs said channel estimation on the first and the second dedicated channel estimation sequence, said first and the second dedicated channel estimation sequence being different from each other.

6. A receiving method for receiving signals in a wireless communication system, in which the signals include a dedicated channel estimation sequence having a first and a second dedicated channel estimation sequence, the method comprising the steps of:

converting received signals into digital samples with a sampling rate identical to a symbol rate of the received signals;

performing a channel estimation based on the first and second dedicated channel estimation sequences included in the digital samples of the received signals;

evaluating a channel estimation result obtained from performing the channel estimation to detect which of the first or the second dedicated channel estimation sequence has the best quality; and controlling a phase of the sampling rate in the converting so that in the converting, the first dedicated channel estimation sequence being converted with a sampling clock having a first phase and the second dedicated channel estimation sequence being converted with the sampling clock having a second phase, the first phase being different from said second phase, wherein the controlling further includes the step of setting the phase of the sampling clock to the same phase which was used in the converting the dedicated channel estimation sequence with the best quality based on the step of evaluating the channel estimation result.

7. The receiving method according to claim 6, wherein in the evaluating step a quality of the channel estimation result for the first and the second dedicated channel estimation sequence is evaluated and a control signal is provided to the control step based on the evaluation.

8. The receiving method according to claim 7, wherein in the evaluating step it is detected when the first or the second dedicated channel estimation sequence has a higher correlation peak and the control step is provided with a control signal to control the analog to digital step to convert data content included in the received signals with the sampling rate phase of the first or the second dedicated channel estimation sequence.

9. The receiving method according to claim 6, wherein the channel estimation step performs said channel estimation on the first and the second dedicated channel estimation sequence, said first and the second dedicated channel estimation sequence being identical.

10. The receiving method according to claim 6, wherein the channel estimation step performs said channel estimation on the first and the second dedicated channel estimation sequence, said first and the second dedicated channel estimation sequence being different from each other.

11. A receiving apparatus that receives signals in a wireless communication system, in which the signals include a dedicated channel estimation sequence, the apparatus comprising:

an analog to digital converter that converts received signals to digital samples with a sampling rate identical to a symbol rate of the received signals;

a channel estimation unit that performs a channel estimation based on the dedicated channel estimation sequence included in the digital samples of the received signals;

an evaluation unit that evaluates a channel estimation result from the channel estimation unit; and a control unit that controls a phase of the sampling rate of the analog to digital converter based on the evaluation of the channel estimation result, wherein the evaluation unit detects when the first or the second dedicated channel estimation sequence has a higher correlation peak and provides the control unit with a control signal to control the analog to digital converter to convert data content included in the received signals with the sampling rate phase of the first or the second dedicated estimation sequence.

12. A receiving method for receiving signals in a wireless communication system, in which the signals included a dedicated channel estimation sequence, the method comprising the steps of:

converting received signals into digital samples with a sampling rate identical to a symbol rate of the received signals;

performing a channel estimation based on the dedicated channel estimation sequence included in the digital samples of the received signals;

evaluating a channel estimation result obtained from performing the channel estimation; and controlling a phase of the sampling rate of the analog to digital converter based on the evaluation of the channel estimation result, wherein in the evaluating step it is detected when the first or the second dedicated channel estimation sequence has a higher correlation peak and the control step is provided with a control signal to control the analog to digital step to convert data content included in the received signals with the sampling rate phase of the first or the second dedicated channel estimation sequence.

* * * * *